US006708160B1

(12) United States Patent
Werbos

(10) Patent No.: US 6,708,160 B1
(45) Date of Patent: Mar. 16, 2004

(54) OBJECT NETS

(76) Inventor: Paul J. Werbos, 5304 First Place North, Arlington, VA (US) 22203

(*) Notice: Subject to any disclaimer, the term of this patent is extended or adjusted under 35 U.S.C. 154(b) by 0 days.

(21) Appl. No.: 09/544,143

(22) Filed: Apr. 6, 2000

Related U.S. Application Data

(60) Provisional application No. 60/127,952, filed on Apr. 6, 1999.
(51) Int. Cl.⁷ ........................... G06N 3/06; G06N 3/063; G06N 3/067
(52) U.S. Cl. ............................. 706/30; 706/15; 706/23
(58) Field of Search ............................. 706/15, 23, 30

(56) References Cited

U.S. PATENT DOCUMENTS 5,613,042 A * 3/1997 Chung et al. ................. 706/30
5,671,335 A * 9/1997 Davis et al. .................. 706/25
5,828,812 A * 10/1998 Khan et al. .................... 706/2

* cited by examiner

*Primary Examiner*—Anil Khatri
*Assistant Examiner*—Joseph P. Hirl
(74) *Attorney, Agent, or Firm*—Oblon, Spivak, McClelland, Maier & Neustadt, P.C.

(57) ABSTRACT

A method, system and computer program product for implementing at least one of a learning-based diagnostics system and a control system (e.g., using a neural network). By using ObjectNets to model general object types, it is possible to design a control system that represents system components as relational structures rather than fixed vectors. Such an advance is possible by exploiting non-Euclidean principles of symmetry.

14 Claims, 5 Drawing Sheets

OBJECT NETS

CROSS-REFERENCE TO RELATED CO-PENDING APPLICATIONS

The present application claims priority to U.S. Provisional Application Ser. No. 60/127,952, filed Apr. 6, 1999, naming Paul J. Werbos as the sole inventor. The present application further is related to other applications naming Paul J. Werbos as the sole inventor. Related applications include: application Ser. No. 08/867,871, filed Jun. 4, 1997, entitled "3-BRAIN ARCHITECTURE FOR AN INTELLIGENT DECISION AND CONTROL SYSTEM"; application Ser. No. 09/147,338, filed Dec. 4, 1998; application Ser. No. 09/271,439, filed Mar. 18, 1999; application Ser. No. PCT/US97/09724, filed Jun. 4, 1997; application Ser. No. 08/867,871, filed Jun. 4, 1997, now U.S. Pat. No. 6,169,981; application Ser. No. 09/404,197, filed Sep. 23, 1999; application Ser. No. 60/152,167, filed Sep. 2, 1999; and application Ser. No. 60/152,922, filed Sep. 9, 1999. The contents of those applications are incorporated herein by reference in their entirety.

BACKGROUND OF THE INVENTION

Field of the Invention

The present invention is directed to neural networks and especially to neural networks using general diagnostics and value functions for any kind of relational system—e.g., power grids, communications networks, traffic networks, and manufacturing systems. The present invention is further directed to learning-based diagnostics and control in general.

SUMMARY OF THE INVENTION

One object of the present invention is to provide a software and/or hardware system for implementing an adaptive learning system.

It is a further object of the present invention to provide a software and/or hardware system for implementing a neural network.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
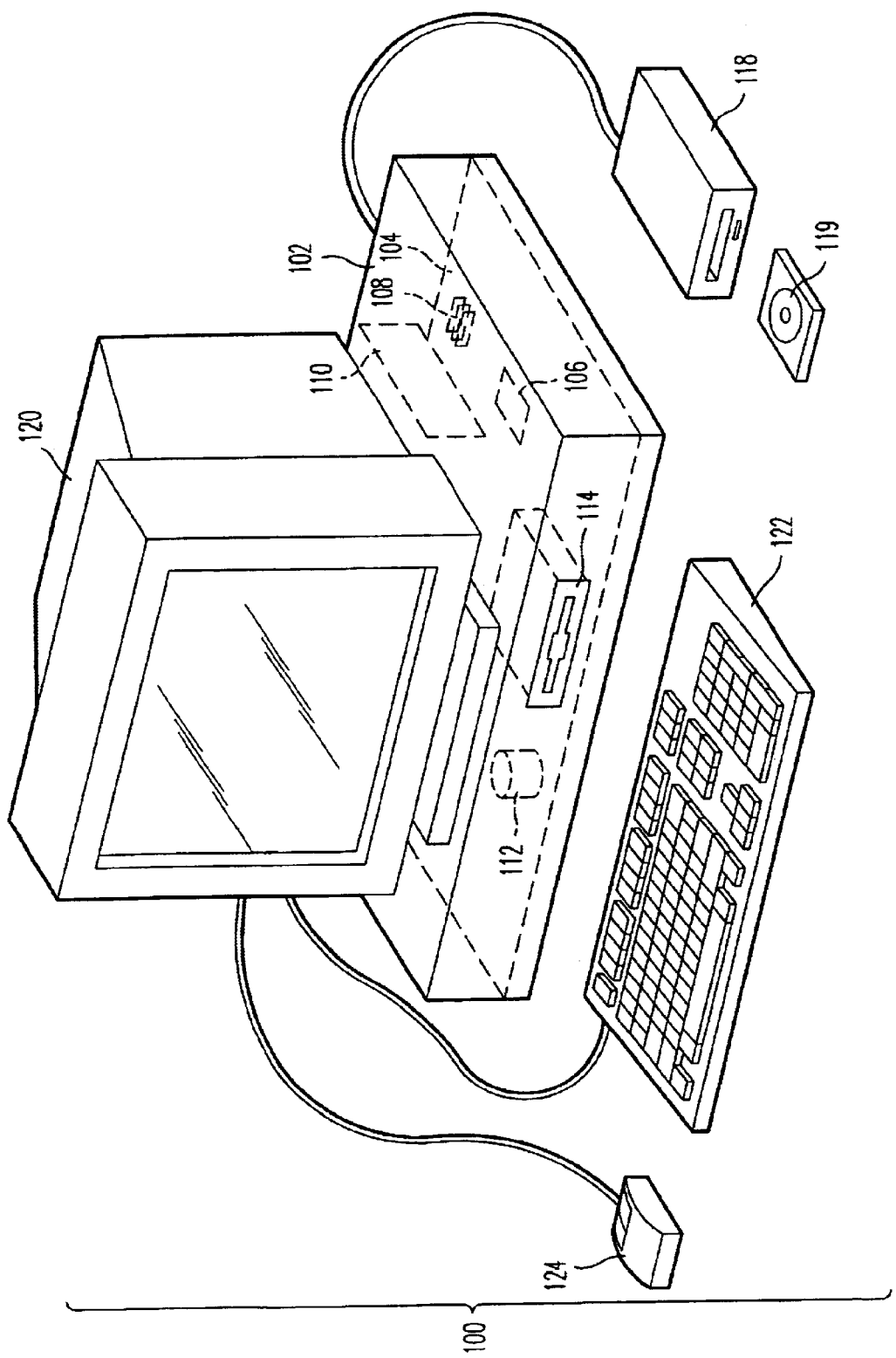
FIG. 1 is a schematic illustration of a computer system according to one embodiment of the present invention.
Figure 2:
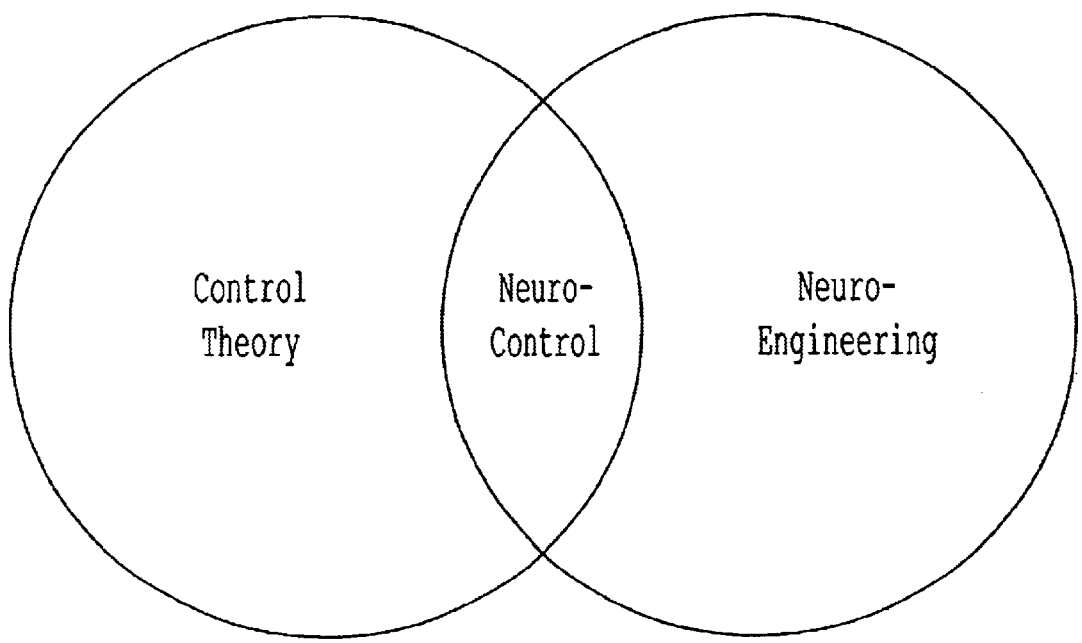
FIG. 2 is a diagram showing that neuro-control is the overlap between control theory and neuro-engineering.
Figure 3:
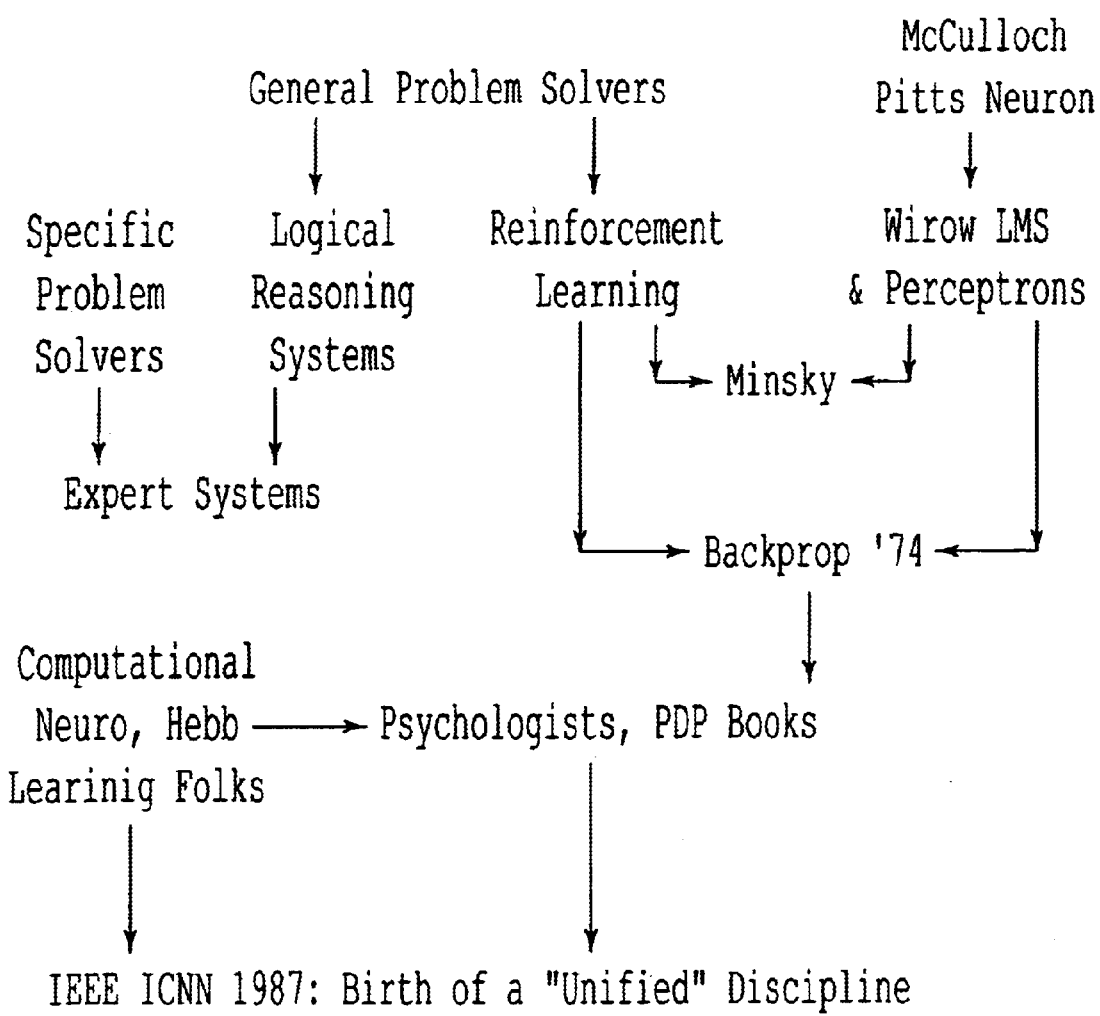
FIG. 3 is a flow diagram showing the inventor's theory of the evolution of artificial neural networks (ANNs)
Figure 4:
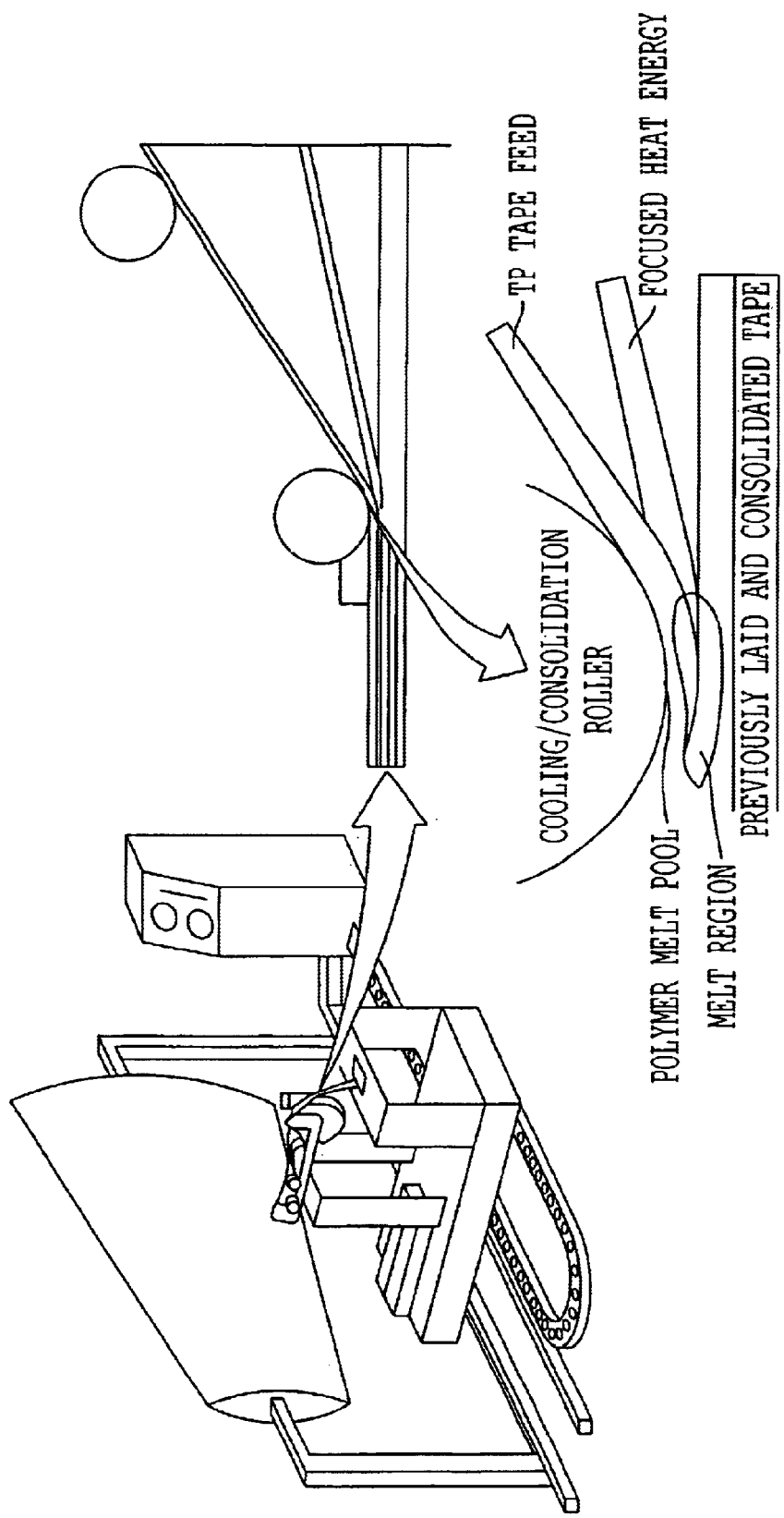
FIG. 4 is an illustration of a possible use of ANNs in manufacturing of thermoplastic parts.

Referring now to the drawings, wherein like reference numerals designate identical or corresponding parts throughout the several views, FIG. 1 is a schematic illustration of a computer system for implementing a software version of the neural network system according to the present invention. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of neural networks and overall control systems.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for implementing a neural network. The computer code devices of the present invention can be any interpreted or executable code mechanism, including but not limited to scripts, interpreters, dynamic link libraries, Java classes, and complete executable programs. For example, any one of the computer code device embodiments of the present invention can be used to display on the monitor the results of actually controlling or simulating control of an external device (e.g., a supersonic or hypersonic jet).

ObjectNets are a new class of neural network, designed to employ inputs or outputs which form relational structures rather than fixed vectors, as in traditional neural networks. This can be done in an efficient manner by exploiting certain non-Euclidean principles of symmetry. Additional details of those non-Euclidean principles of symmetry can be found in U.S. Pat. No. 6,169,98 entitled "3-BRAIN ARCHITECTURE FOR AN INTELLIGENT DECISION AND CONTROL SYSTEM." This present invention further describes those principles and the method of implementing them in greater detail. The more advanced methods initially are contrasted, in a series of examples, against the principles used in two earlier types of neural networks—conventional and Euclidean-symmetric networks.

Sometimes an elementary example, on the road to building a brain, also corresponds to an economically important application area (as Bernie Widrow's invention of the modem, in effect, illustrates). Such examples are called "testbeds." Thomas Kuhn understood about examples—that's what a "paradigm" really is, in the original definition (definition 1). So "building new paradigms" means, in a sense, constructing lots and lots of good examples to think about, to guide one's thinking. But all those people who read Kuhn have basically redefined "paradigm" to mean (2) a kind of conceptual framework or gestalt for understanding a domain of thought; or even (3) a strategy for emitting meaningless noises in the search for funding. So my goal here is more like Kuhn's original idea to use new examples to drive a new way of going at these problems. A brain-like system should be able to cope with ALL of the examples.

As a first approximation, we can separate out the value-driven and temporal aspects of intelligence from the spatial aspects. This won't hold up forever . . . but consider . . . even higher-order time-chunked intelligent decision-making systems are constructed from elementary components performing tasks such as prediction or matching or supervised learning. Each such component has one primary input channel and one primary output channel. (The biologist might note that the "primary input channel" may actually be the merger or combination of output channels from different sources; I am not simplifying THAT far!) My concern here is essentially—what are these input channels and output channels? How can we do predictions in a way that accounts for the spatial, relational and field structure of the things we are trying to predict? For now, it is enough to think about the task of prediction; this embodies all the essential difficulties. (It also has engineering applications in its own right.)

A "Vector" Example

Suppose a neural style learning system is used to predict outputs or even breakdowns in a smallish chemical reactor. Suppose we have 77 sensors, say, monitoring the process, and maybe 13 instrumented control valves of some sort. Suppose that they all operate at a frequency of, say, 10 hertz—ten frames per second. Thus every 0.1 second, we observe 90 numbers (sensor inputs and control settings). Assuming that we KNOW the control algorithm, our main task in prediction is simply to build a network which inputs the state and controls at time t, and predicts the state (77 numbers) 0.1 seconds later.

Leaving aside the issue of longer-term predictions . . . this would be a great application for the traditional kinds of ANN, where the inputs and outputs are each considered to be vectors. The input vector is just an ordered set of 90 numbers, and the output is a vector with 77 components. With few exceptions (mainly Kohonen's stuff, for useful ANNs, and maybe some specialized image processing systems) this is how all ANN work and research is done—with vectors of inputs and vectors of outputs. You could even say this is part of the "standard paradigm" of ANN research (where "paradigm" is defined by definition (2)). It works fine in this kind of example, where there is a fixed and finite number of input streams . . . and few enough input streams that we really can afford to keep track of every one of them, using modern chips, and we can afford to lose prior information about their interrelations (more or less).

Euclidean Grid Examples

But then comes a different class of examples. Suppose that we are inputting pixels from a camera looking at handwritten ZIP-code digits. (Or an overhead view of a maze to be traversed, as in the papers I did with Xiaozhong Pang.) In a formal way, if the pixels form a 16-by-16 grid, that's still only 256 inputs and one can afford to treat them as unrelated variables—as a vector. People have in fact tried to do ZIP code recognition using basic backpropagation in exactly that way. But the results are mediocre, in practice. For ordinary sized databases (like the Post Office standard benchmark datasets), there is a mismatch between the number of observations in the database and the huge number of weights one would need to make such a network work. When there are more weights than observations, estimation is poor. This circumstance has been very convenient for a lot of mid-level neural net salesmen, trying to prove that their pet ANN method works "better than backpropagation."

The best results in this situation have come from using basic backpropagation WITH a certain modification. (More precisely—Jay Lee, who was formerly one of the relevant Post Office officials, then later at NSF, and now Director of R&D at United Technologies, reported to me what the lead performers really were in their many comparisons.) The modification is an elegant, straightforward approach which has unfortunately had many names—(Euclidean) "Lie group symmetry"; "weight sharing;" "moving window method;" and some other name I forget, something like "conformal convolution," recently cited by Lee Giles of NEC. In my paper with Pang, we used the term "CELLULAR SRN" to describe a powerful way of implementing this general type of modification.

In the long paper with Pang (included in the 3-brain patent disclosure), we DISCUSSED several possible situations, but we deliberately chose to IMPLEMENT the simplest situation. In the simplest situation, the inputs form an array of pixels, and the desired outputs or targets ALSO form an array. The neural network connecting inputs and outputs does NOT treat them as a vector of 256 inputs and 256 outputs!! Instead—we CONSTRAIN the neural network so that it must OBEY a certain principle of symmetry—that a spatial shift (translation) in the input pattern must result in the exact same spatial shift in the output pattern. Yes, folks, a physicist would say that this an application of relativity theory. To meet this constraint, in a constructive way, we construct our neural network as a collection of CELLS . . . each cell was a set of five artificial neurons "located over" a pixel. Furthermore, we required that each cell must be identical EXCEPT FOR the fact that it gets its inputs and outputs from the pixels "at its location" and from its four neighboring cells. Every cell uses exactly the same structure and weights as every other cell.

This is similar, in most respects, to the structure which AT&T (Guyon et al) used for their best-results ZIP code recognizer. But there are a few subtle points, which might be important to some people. The AT&T structure was entirely FEEDFORWARD. If Pang and I had used a feedforward structure like what I just described, the result would be entirely LOCAL. The outputs at one point in space would depend only on inputs from nearby points. The network would be unable to compute nonlocal relations. HOWEVER: because we put a recurrent loop into each cell . . . (that's what "SRN" is about) . . . it was able to analyze NONLOCAL relations. In fact, the mapping which Pang and I learned WAS nonlocal. (By the way, LeCun later developed a modified ZIP code recognizer, using much more prior information in a complex way, still with basic backpropagation, which performed only marginally better than Guyon et al on the Post Office data. It did significantly better on smaller, truncated data sets—as one might expect.)

Note: in the arrangement Pang and I used, only FIVE neurons had to be adapted . . . this REALLY solved the problem of mismatch between number of observations and number of weights! It was an expensive solution, on a PC, but there are special purpose chips now from Chua that already cut the costs tremendously, before we even do fiddling.

The key idea is that our requirement for spatial translation symmetry (relativity) gives us N*2 (like 256) times as many observations, in effect, for each actual observation. We are exploiting this apriori information to improve training.

By the way, the Pang & Werbos paper describes what we did in truly elaborate, concrete detail.

Structured Networks

Years ago, people felt that this ZIP code situation was something of an anomaly. Most data in the real world does not come from regular, Euclidean 2D grids. Even in the brain, inputs come from cells in the retina which are very, very non-rectangular in their distribution; they form something like bands centered on the fovea, where pixels are far more dense than they are further out. Maybe this sounds like cylindrical symmetry . . . but how do you place SPECIFIC INDIVIDUAL pixels to enforce any kind of continuous symmetry?

Figure 5:
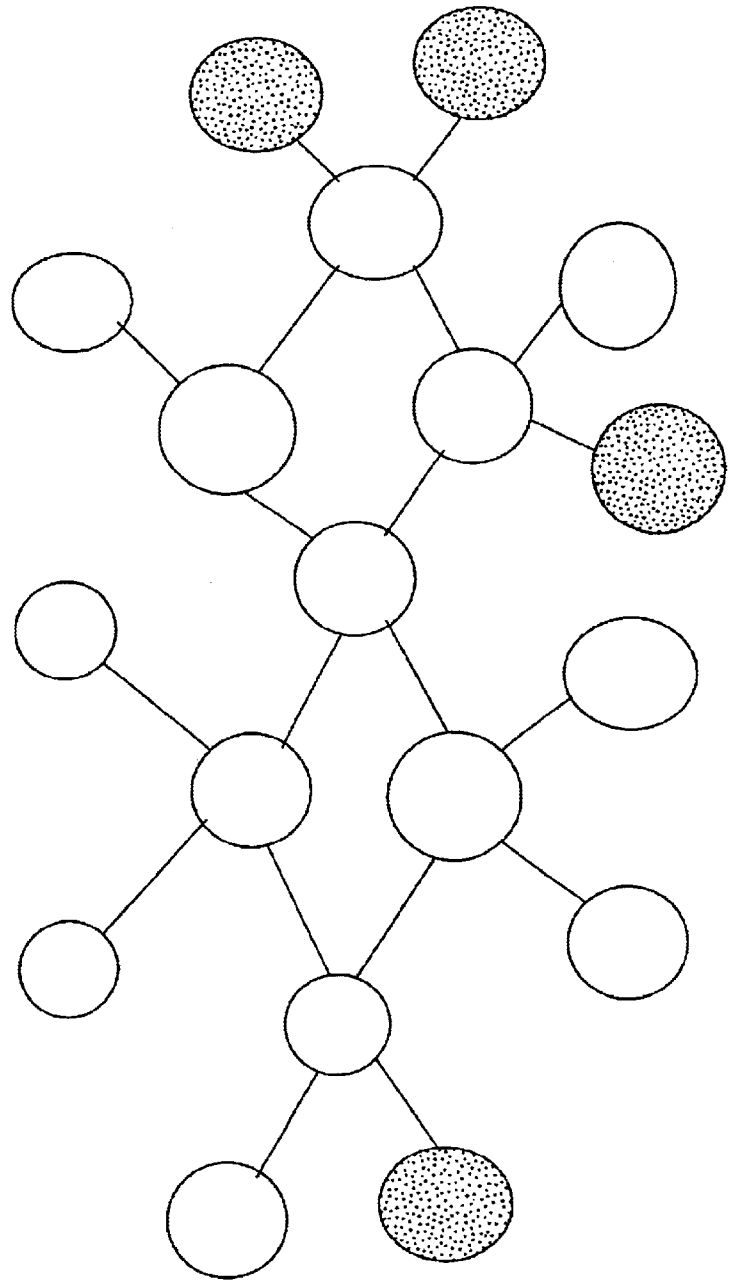
FIG. 5 is a network diagram illustrating various parts of a system that can be modeled using object nets.

Turning now to the example of FIG. 5, consider the case where your input array is called "an electric power grid." For example, for simplicity, let us assume that a grid is made up of hundreds and hundreds of objects, all the same kinds of objects, called "sources," "loads", "wires" and "busbars." For each object, let us assume that we have something like 10 inputs available . . . one of which represents catastrophic failure. Suppose that our prediction problem is to train ONE neural network to address the failure prediction problem, defined as follows. Input the 9 non-catastrophe variables for ALL objects (as a set) for any time t; predict the set of catastrophe variables for all objects for time t+1.

IF the data for training and application comes from a collection of DIFFERENT electric power grids, then we can't treat this input data as a "vector" in a sensible way! The reason is very straightforward: if one grid had 115 objects, the input vector for that grid would be 115*9 numbers; if another grid had 120 objects, it would have an input vector of 120*9. You could kludge this up by using a vector large enough to hold the longest input string, and "padding the string out with zeroes." But those kinds of encoding schemes typically result in weird functions which are hard to learn. Also, 120*9 is a LOT of inputs. Also, even individual electric utility systems often change their grid structure at this level. Somehow, to get better results, one would want to EXPLOIT the fact that the relation between inputs and failure is not some arbitrary mathematical function—that it reflects the underlying structure of grids made up of relatively uniform objects. (And, by the way, non-uniformities which DO exist will partly be reflected in the data streams anyway—thus a uniform sort of model exploiting those data streams should be able to work well, somehow.) The exploitation of input structure is just as important here as it was in the ZIP code example!

Yet how could we exploit such input structure? The electric utility grid is certainly not a bunch of squares located on an array of pixels! We can't use the standard Euclidean idea of spatial translation from relativity theory. What can we do?

In fact, from a very earthy, practical point of view, there is a relatively straight forward crude approach to this problem. It's a beautiful example. The group at the University of Dortmund showed me a nice color PC demo at Munich in 1995. It is also described in the tutorial book on neural networks and electric power, edited by El-Sharkawi and Niebuhr, distributed by the IEEE Power Society. The Munich demo showed a nice color depiction of an electric power grid, in something like Gensym, already set up to input from the real thing.

For each TYPE of object—busbar or wire, or whatever—one can train a feedforward neural network to input its state AND the state of its neighbors at time t, and predict its failure at t+1. (I think they had a few different fine points—I am simplifying—but theirs was also quite simple.) More precisely, one can train, for example, a neural network model of "busbars connected to four wires." It would input 9*5 numbers (state of busbar and state of each connected wire), and output just 1 (catastrophe at busbar). There would be only ONE such network, trained over ALL examples of ALL four-wire busbars. A global feedforward network would be constructed, in effect, as the COMBINATION of individual object-networks, each describing ONE class of object. This configuration can take advantage of the symmetry of the connections.

I asked those folks at Munich: what about nonlocal interactions? Lots of interactions occur over time, very quickly, in electric power grids. How do you track them?

They answered: Well, we seem to do OK with this approach. We agree we would need to do more to account for a lot of the problems, but haven't got the foggiest idea how to do more, to account for cross-interactions and nonlocal effects and such. That probably would be critical to the applications involving manufacturing lines (which we have also looked at, in THEIR object-based Gensym representations). But here . . . what we have is at least better than anything else which exists for the electric utility problem. Our problem is that we don't know the US market very well, we don't know how to get to it.

(By the way, I have also had significant contact with El-Sharkawi and Niebuhr, both in the US, the latter of whom got her PhD from the Dortmund group.)

In fact, the solution—stated in the 3-brain patent disclosure—for nonlocal interactions is straightforward, once the principles are defined. The solution is to wrap the feedforward object-model structure in simultaneous recurrent loops (SRN), and train the entire structure using the same kinds of procedures discussed in Pang and Werbos (for which there are several legitimate variants). That's basically it. Use the same structure as in Pang and Werbos—except that: (1) the "cell" over each object will be DIFFERENT depending on what type of object it is (as in the Dortmund work!); (2) additional inputs will be added to the Dortmund design, implementing recurrent loops, inputting from the same cell AND from its neighbor cells—as in Pang and Werbos. (In this case, the "neighbors" are defined in terms of the CONNECTED objects, not Euclidean spatial relations.) This is the basic ObjectNet SRN design.

The basic ObjectNet SRN design is truly general in nature. It can be applied to any problem in which the inputs or outputs are defined as a network of related objects. Internet management or transportation network management (or manufacturing line management, IF the tools are not all one-of-a-kind) are examples.

In fact, one can come back to the maze example that Xiaozhong and I looked at, and redo it. In the mathematical theory, it's a nasty fact that translational symmetry is upset by the boundaries of the maze. We used network adaptation/approximation to insure strict symmetry with the maze. (Similar to the approximation of "periodic boundary conditions" used in solid state physics to deal with the boundaries of a regular crystal! In the ObjectNet approach, we would not need a the adaptation/approximation; we could define three types of object or pixel—pixels with four neighbors, pixels with three, and pixels with two. Someday we should perhaps try this out, to see if it does better.

When I wrote the 3-brain paper, I hypothesized that the human brain uses something more like ObjectNets than like Euclidean or vector representations of its inputs and outputs. Clearly the inputs and outputs of the brain are ENORMOUS in number . . . such that the vector representation would presumably be grossly overloaded if it tried to treat them as unrelated inputs! Yet they are not Euclidean. And common sense suggests that the idea of "object" may indeed be hard-wired into the brain. The literature on biological vision, which I have just reviewed, reinforces that impression. For example, the work by Van Essen and his collaborators seems to dominate what is known about the visual system, in an overwhelming way; the very first major principle in that work is that there are two main streams of processing, one of which asks "what is it?" (what is the OBJECT) and the other of which asks "where is it?" (which suggests a kind of moving window, a compression of inputs based on the idea of the location of an object . . . which sounds almost Euclidean!).

The discussion above leads to several different strands of follow-up. One strand would try to improve or evaluate the ObjectNet SRN model as described above. Another strand would try to imagine how it (or the vector or Euclidean alternatives) might be implemented in the brain.

Applying ObjectNets to Understand/Replicate Brain-like Capabilities

This section will explore the way in which ObjectNets may be implemented in the brain, and to draw out lessons about the hardware implementations available, in the long term, in engineering, as we build ever more advanced and powerful implementations. For the sake of simplicity, this section will focus on the use of ObjectNets in PREDICTION. However, the reader should bear in mind that: (1) in engineering, the most powerful systems for prediction or system identification (like these) automatically yield data compression, filtering and estimating a representation of the underlying external reality (often called "state vector" or "world model"); (2) the advanced learning control systems described in the 3-brain disclosure include components, like Critic networks, which essentially perform certain PREDICTION tasks of importance to control'; it is straightforward to insert ObjectNets into the "boxes" in such control designs. The existence of circuits which learn to do prediction over time in the brain has been confirmed, for example, by the work of Chapin and Nicolelis.

There are three ways that Object symmetry might be handled, defacto, in the brain:

1. parallel learning (tacit)
2. broadcasting of weights
3. multiplexing

In parallel learning, the essential structure and learning rules LOOK as if they are based on simple vector processing, except that the CHOICE OF CONNECTIONS to train and the actual flow of inputs reflect the symmetries. In other words, each "cell" (or assembly) is trained in parallel (independently) of every other "cell," even though they perform similar functions. They may be connected mainly to NEIGHBORING cells in a topographic map in cortex, but that's all. They learn similar things, in practice, mainly because the image of an object moves all over the retina and the cortex, giving the different assemblies a chance to learn about it.

Broadcasting is more like the formal procedure used with ANNs. It would involve a "master copy" of each assembly (or "cell") type, hold the "master values" of the weights. As these are adapted, they are broadcast out (copied) to the copies of the master assembly. Each copy operates in parallel to analyze the multiple instances of the same type of object currently being perceived. The errors of each copy are broadcast back to the master assembly, which accumulates all errors and modifies the master weights. (A minor modification of this design would have errors broadcast from all assemblies to all other assemblies, without use of a "master assembly.") This design could learn much faster, in theory . . . but it requires a heavy commitment to the choice of how to match up assemblies. Note that I have shifted from using the word "cell" to using the word "assembly," because in a biological context these aren't just individual neurons! (e.g. with Pang, each "cell" had five neurons.)

Multiplexing uses only ONE physical copy of each Object Model. It assumes that there will be a kind of gating control which RE-USES the same physical network or assembly over and over again, by injecting the inputs which comes from different objects.

Match to Brain??

The next step is to try to match these three implementation approaches both to the brain and to engineering applications.

In engineering (e.g. with electric power grids and telecomm grids) the strategy for current research is to use MULTIPLEXING. In fact, whenever we use a serial computer (like a PC) to implement an SRN, we are using multiplexing. We only execute one instruction at a time. CONCEPTUALLY, Pang and I used the same cell model "in parallel" over the entire input grid. But in the computer program, we just used "a DO LOOP". (A "for" loop, to be precise.) We called on the cell over and over again for different locations. By contrast, the Chua chip uses broadcasting to achieve the same effect, with a truly fast parallel implementation. In engineering, after we identify a symmetry, the strategy is to exploit it to the hilt; multiplexing and broadcasting allow mathematically equivalent, optimal strategies for doing so.

But the brain is very different. In my view, broadcasting is reasonably absurd as a model of how the brain is hard-wired to work. This is especially true when one considers the fuzziness of object categorization, especially during the learning process. But the main mechanisms have to be a COMBINATION of parallel learning and multiplexing.

The parallel learning aspects are quite interesting, if one considers early vision and somatosensory processing. In Arbib's Handbook, there are lots of fascinating papers on vision.

There is a paper from the German Hanspeter Mallot, perhaps of Singer's school, arguing for "field processing" in the brain. He also cites Amari (and others) as earlier practitioners of field modeling. A key axiom in his field modeling is maintaining spatial invariance or relativity principles. From what I see about somatosensory topographic maps, however, the Euclidean symetry assumption looks quite absurd (not to mention the implementation problem!). Given the principle of mass action across cortex, it is far more plausible that any learned symmetries are learned via parallel learning, not this kind of hard-wired relativity. But Mallot's paper is clearly somewhat theoretical, shall we say, in orientation; it does not address where the actual topographic maps come from. Still, he is trying to enshrine the important observation that we see lots of fields or topographic maps somehow in the brain.

Thinking back . . . in regard to early vision . . . Hebb stressed long ago the important finding that arresting eye movement causes images to fade out . . . that the brain, UNLIKE the usual engineering CCD systems, can't just "fixate and forget it" and continue to see well. The MOVEMENT of an image across the screen of early vision is essential to making parallel vision work.

As I think this over . . . it does change my feeling for what I learned in the work with Pang. IF Pang and I had: (1) used the same exact structure, but NOT constrained the weights to be the same across cells; (2) had initialized the weights to be the same nevertheless; (3) had expanded the training set by including all possible spatial translations of the inputs, the same number of copies of each . . . then . . . with the batch learning procedures we used (for the sake of machine efficiency) . . . we would have gotten the EXACT SAME RESULTS in the end!!! This does follow from the mathematics. We would have used 100 times as much computer time to get there (well . . . N**2 times as much, where N is the width of each square image) . . . but we would have followed the EXACT same path of weight changes, and ended up in exactly the same place. Parallel learning would have worked. The cost factors are a bit different in the brain . . . but for the brain, the point may be that flexibility and parallel operation are often worth the price. Certainly for early vision and touch, the ability to process many stimuli at the same time, rapidly, is worth the price . . . and AFTER learning, the processing is fast. Rapid eye movements have an effect similar to the "all translations" game. Higher order effects in gradient correlations may reduce the actual cost penalty of the parallel approach, in the brain.

But then what about multiplexing . . . which is evident in Van Essen's work and elsewhere?

In engineering, those first words by Van Essen about "where is it?" seem to have an implementation. One can try to represent an object by shifting it to a kind of canonical representation, centered on the center of the object itself, and then recording the geometric coordinates of the object. The coordinates plus the centered description could be used to reconstruct the original image exactly. (This is a kind of data or image compression, too.) This kind of representation could be very useful in an application like image processing for missile interception—the exact coordinates (and velocity) of the missile object are what we need to have. In biology, there are lots of examples of high-precision ballistic control which seem to require that kind of coordinate representation, analogous to what missile interception requires; there are birds and bats who swoop down on their prey, after highly precise echolocation—and some groups of primitive humans and monkeys are also well known for their very precise aim.

HOWEVER: as I review that literature, it seems clear that is essentially NO traditional q,p (position, velocity) coding in the brain. (Well . . . maybe by accident in some secondary hidden units in the cerebellum or such, but not as a primary or deliberate representation.) An place to look would be in the echolocation structures, which have been well-structured. But in the review of that in Arbib's handbook, it's clear that location has one of those typical field codings, in the outer layer of the inferior colliculus . . . there are lots of cells representing different LOCATIONS, and the location of an object is represented by a firing of the cells "at that location." It's clear that the gap between cells is large compared with the apparent precision of echolocation . . . but . . . "that's tough" . . . a map from an APPARENTLY imprecise location field to action results in highly precise control. The point is that the apparently imprecise map IMPLICITLY contains precise information (which might be extracted using interpolation methods?), and that's all that's needed, for inputs to a downstream neural network.

LIKEWISE: in studying Van Essen's stuff, I note that even his higher-order "location and movement" cells are still based on RECEPTIVE FIELDS . . . they aren't a p/q coding! Oodles and oodles of topographic maps, in effect.

Where can one find multiplexing in such an arrangement?

I DON'T see this kind of multiplexing in any of the neural models from Grossberg. He talks a lot about Van Essen's "what" and "where". Grossberg's two streams are just contours and interiors, defined over uniform receptive fields. The traditional receptive field approach. No "gating" of inputs from different sources.

In Arbib's Handbook, there is truly fascinating paper by Olhausen AND Van Essen (and someone). A computational model which Van Essen himself puts his name to, accounting for data which he rightly points out the other folks ignore!!! And it has a lot of the spirit of what some engineers are doing in image processing! (I think Bill Hartmann of Germany has discussed very similar approaches, and I wonder if the superior performance of the German image systems is related to this, to some extent.)

In fact, the model is ridiculously simple in some ways . . . a caricature model, but a good caricature can be useful. According to this model, the PULVINAR (a part of the thalamus) basically decides where to "look" and on what scale to "look," inside the mind. (This is called "covert attention" as opposed to "overt attention" . . . it's where the mind looks, not where the fovea is pointed. It is empirically well known that covert attention exists, that the mind does not just blindly track the eyeball.) Think of THREE variables per eye—two spatial coordinates and one scaling factor. Through some kind of gating/shifting circuitry, governed by the pulvinar, a DIFFERENT IMAGE (the image at the desired two coordinates, scaled) appears at different times in the SAME area of cortex. Van Essen elaborates: EMPIRICALLY, he has shown that the "receptive fields" of cells in some regions change dramatically as a function of attention; in effect, the cells "look" in different locations, as function of where the pulvinar tells them to look. This is certainly a model of true multiplexing. ALSO: this provides a very solid empirical basis for addressing the kinds of questions Singer leaves open at a far more abstract, theoretical level. But is it the pulvinar (as opposed to correlations and self-assembly) which select/gate to the object of current attention? Perhaps . . . even if the model is oversimplified, the ideas and the evidence are good starting points.

3-Brain Model

In the 3-brain model, my view was that the INPUTS to the brain are encoded, in effect, as relational maps . . . variables attached to cells, which have an apriori relational map of PROXIMITY. (e.g. this visual input is adjacent to that one . . . ). Not only the stream of inputs, but also the relations, are used in constructing the next higher maps. And then successive stages of processing are simply analyzing and further abstraction . . . defining maps at higher levels, specifically anchored to related maps at the next lower layer.

But are relational maps enough to describe what goes on, and what is possible? What about COORDINATES as such? Well . . . the biological reasoning and the literature above . . . they tend to convince me that the usual (p,q) coordinate representations simply don't appear in the brain. They may be useful in some specialized settings, but that's it. Period.

By the way, for those interested in quantum physics, there is an interesting parallel here. Field representations for location are to functional integrals as ordinary coordinate representations are to path integrals. It's interesting that the first two match reality, and the second two don't, both in the brain and in physics. Coordinate attributes for objects can be LEARNED and used—like any other attributes or relations—but they do not need to be in the primary, integrative structure, hardwired.

So: this seems reasonably promising, at first, in terms of really explaining the brain in terms of the designs already in hand, based on ObjectNets (and the extended concepts for chunking with object nets mentioned briefly in the patent disclosure). But it doesn't answer all questions . . .

A key problem in understanding the brain is that we DON'T have a "screen of the mind" which represents (in active, electronic spike form) our image of the present state of the universe. In computer implementations, we can afford to do that—but the brain can't. And in any event, the tools which the brain uses to live within this constraint may yet be useful in engineering as well, to contain computational costs etc.

Intuitively . . . one may think as follows. The brain does have two "screens" (like movie screens) which are electronically active. One, the thalamus, simply shows current sensor inputs. The other—the output of layer (V or VI) pyramid cells in neocortex—DOES show a reconstruction of reality—but only of part of reality, the part under active consideration, the Heidegger "Being space," the "short-term" or "working" memory . . . Rather than go so far, I think of them as the inner and outer movie screen . . . (but which is which? PHYSICALLY, the neocortex screen is the outer one, but the thalamic is the one which inputs outer data as opposed to inner reality . . . ). CONCEPTUALLY, the system may be defined to work on a CONCEPTUAL image of reality which is too big to hold in the neocortex screen; thus the neocortex acts as the active part of a VIRTUAL memory scheme. When part of the neocortex image becomes less relevant, and you try to think about something which is currently in memory . . . it's exactly like a "page fault" in virtual memory schemes, where a page is pulled out of disk and into RAM, to create the illusion of a larger RAM.

That's one way to think about it—crude, but not bad.

The point is that there is some very heavy multiplexing going on, as different aspects of reality are pulled in and out of working memory. You can relate this to your everyday experience. One moment, as you think of going to your office, some kind of map jumps up into your mind. Then, after your plan/decision is set, you start looking for your wallet, and a totally different map enters into your working memory—into ESSENTIALLY THE SAME GROUP OF CELLS! You might say that the "receptive fields" of these higher cells have changed . . . but they mostly aren't inputting from current visual inputs anyway!!! This is really very heavy duty multiplexing, to use the same arrays of cells to represent reality in such fundamentally different ways, at different scales. Van Essen's data are just the top of an iceberg.

There are some interesting implications.

In creating a CRUDE brain-like efficient design (as a start), I picture "three stores"—(1) condensed working memory representations, multiple ones in parallel, each representing a different object; (2) a more detailed object representation, in working memory, multiplexed and linked to ONE of the condensed representations; and (3) a deep store, like a "disk."

Because of the deep store . . . because of THAT kind of multiplexing . . . I suddenly have more respect (still bounded of course) for some of the weird cyberneticists I once heard Umpleby of GWO talk about. They had lots of deep meta-physical problems with neural nets or anything else as a model of brain processing. One problem was "yes, you can look at a neuron's output to see the current state of the variable it represents . . . but neither we nor any subsequent neurons can USE that information unless they are also told WHAT THE LABEL is, what the variable MEANS." This seemed very silly, from the viewpoint of vector processing paradigms. If you keep track of variable number 187 as a separate variable . . . that's all the label you need. HOWEVER: if the meaning of a given neuron's output really DOES change dramatically over time, label information matters. Without labels . . . the functions become weird approximations and are hard to learn, like the approximation vector representation I mentioned for the electric power grid application. So for example, in the Van Essen example . . . not only the image but the pulvinar information on where you are looking . . . (and links to other data on that same particular object) . . . become important in processing that kind of translated visual image.

This really conditions what kind of implementation of multiplexing makes sense! Data AND labels of a sort, so as to allow neocortex to handle radically different parts of the world (different objects) at different times.

Approach to Near-term Engineering Implementation of ObjectNets

One of the key pieces is an approach to dealing with spatial structure. There are actually three key engineering issues here: (1) how to input and output data which form relational structures, rather than vectors of fixed length; (2) how to compress such structures in a valid, learning-based way (not ad hoc AI tricks!); (3) how to handle the huge gulf between the tiny slice of reality that an organism sees and the huge world that it inhabits. In order to develop the engineering here, it makes sense to start out by demonstrating the power of networks which solve the first of these issues—the first, basic variety of ObjectNet.

In neuroscience, it is not so obvious how the brain implements even the simplest kinds of ObjectNets. It is obvious, however, that it must. In Arbib's *Handbook of Brain Theory and Neural Networks* (MIT Press), Olhausen and Van Essen give some ideas about how the brain does multiplexing of visual images, in a way which would provide a simple form of this kind of capability. So far as I know, no other models of biological image processing (except for close relatives like Will Hartmann's model) have this character. Baars has suggested that some of his new work on "multiple searchlights," and empirical work by Legothetis, may shed light on this issue. In artificial intelligence, Lokendra Shastri of Berkeley has begun some new work bridging the gap to neural networks, which may also shed some light on these issues. Even Marvin Minsky claims that his newest book in press may have some relevant insights.

As an example of the use of the present invention, the control techniques described herein can be applied to electric power grid diagnostics. One such diagnostic system was developed by the Dortmund group, one of the two or three most outstanding university groups in the world applying neural networks to electric power issues. (The other obvious group is the University of Washington.)

With reference now to FIG. 5, a grid is illustrated that includes four kinds of objects: (1) wires; (2) busbars hooked up to four wires; (3) G objects and (4) L objects. We assume that there is a fixed set of sensor variables available for each type of object, but different sets are available for different objects. In the Dortmund concept, we train a model for each type of object; we train that model to predict the diagnostics on that object, as a function of the other sensor variables for that object and its neighbors. This has worked quite well in practice—performing just as well as the best expert system available for that task, but offering other advantages.

In my view, we can generalize this approach, by reconceptualizing what is going on here. We can think of this collection of feedforward networks as a SINGLE larger feedforward network. (This is like the idea of a dual subroutine—a way of performing the same calculations, but packaging them differently on a computer and in our thinking.) This feedforward network is a special case of an ObjectNet, a net which inputs a relational structure and outputs a relational structure. But this simple feedforward case can only represent local relations between adjoining nodes in the network. It also has limitations of feedforward networks.

The basic idea is simply to "wrap a recurrence" around the global feedforward network. Strictly speaking, the cellular SRN design described at length in Pang & Werbos is a special case of object net. It is the special case in which there is only one type of object (a grid square); the same object model (cell) is applied over every cell in a rectangular grid.

In retrospect, we could have solved known maze problems using a different approach. We could have defined three types of object—a corner square, an edge square, and an interior square. Using an ObjectNet with three types of object, instead of just one, would have allowed us to solve that problem in a more natural way, without having to create fake obstacle squares to represent the borders of the maze. This would be a straightforward exercise, and a nice way to begin working with this class of network.

The full recurrent ObjectNet design allows for immediate nonlocal connections throughout a grid, mediated by the known structure of the grid. For example, the state of a load at time t might affect a generator at time t+1, even if there are several wires and busbars between them, but the effects must be transmitted somehow over the objects in the grid. SRN ObjectNets can capture these effects, but feedforward ObjectNets cannot. (There are further techniques which can increase the power of both kinds of ObjectNets, discussed in the 3-brain patent papers, but they are beyond the present state of the art.)

Strictly speaking, there are two types of simple SRN ObjectNet. One is the type shown here, where the inputs and outputs are all related to the grid or graph we are modeling or controlling. The other type inputs grid variables, and outputs global variables. That type can be constructed simply by hooking up a grid-to-grid Object net (whose outputs would constitute a set of hidden nodes) and a global SRN, where each input to the global SRN may be the sum (over all of the objects in some object class) of one of the hidden variables. This may sound complex, but the structure may be trained in exactly the same ways that we train the simpler structures, using generalized backpropagation (ROOTS) to calculate all the derivatives required.

The general method of the present invention thus corresponds to identifying a number, n, of different types of objects to be modeled for a system; creating at least n feed-forward networks, one for each different type of object identified; training each of the at least n feed-forward networks; and producing a global prediction for the system using inputs X(t) and the trained at least n (local) feed-forward networks, using a global feed-forward network, FF. An auxiliary vector, y, is added as a field over the entire network (like the inputs X themselves). The structure of the object net is a Simultaneous Recurrent Network given by:

$$y^{[k+1]} = FF(X(t), y^{[k]}, W), \text{ and } X(t+1) = g(y^{[\infty]}).$$

The SRN can then be trained using the techniques described in Pang & Werbos.

In general, artificial neural networks (ANNs) according to the present invention are capable of advanced processing. ANNs can be used in distributed/network I/O applications. They can be used to learn at various levels of a hierarchical decision system. They can also be used in conjunction with "imagination" networks which learn from domain knowledge how to escape local maxima or minima. Additionally, the can be used to predict true probability distributions.

These ANNs are generally based on either of two types of models. The first is a fixed model resembling one or more biological circuits (e.g., silicon retina, cochlea, or vision systems of Grossberg and others). The second model is a general purpose learning system using $6^{th}$ generation hardware.

Using these, or other neural networks, what can be learned from the data applied thereto? Patterns within the data (e.g., clusters and non-linear factors) can be detected. Similarly, data-based prediction (either static or dynamic) can be achieved by training the network to predict an output using previous outcomes and their corresponding inputs. Additionally, learning-based control can be achieved which is directed to problems of cloning, tracking and optimization over time.

One portion of a control system is a diagnostic system. Generally there are three types of diagnostic systems, each which (1) trains one or more predictors, (2) uses sensor data, X(t). (and optionally other data u(t), and (3) classifies faults (e.g., $F_{1, to\ Fm}$). The first type of diagnostic system predicts $F_i(t)$ from X(t), u(t), and information stored in memory. The other two types of diagnostic system predict X(t+1) from X(t), u(t), and information stored in memory. The second. type generates an error or alarm condition when an actual X(t+1) differs from a predicted X(t+1) by more than $6\sigma$. By contrast, the third type generates an error or alarm condition when the network predicts that a "bad" condition will occur at X(t+T). In order to provide the most robust diagnostic system, the three types of systems can be combined into a hybrid system. See Maren, ed., Handbook of Neural Computing Applications, Academic, 1990, for additional details.

Backpropagation: General Principles and Issues for Biology

The backpropagation algorithm probably underlies 80 percent or more of the value-producing applications of Artificial Neural Networks (ANNs). The algorithm is used in many different ways, and in may different forms, ranging from simple pattern classification using feedforward networks through to support of complex decision-making systems full of feedback loops. Until recently, few neuroscientists believed that backpropagation in any form could play a critical role in the brain itself; however, new results have begun to change that situation.

Most psychologists and neuroscientists are familiar with only one form of backpropagation—a simple form, now called "vanilla backprop," popularized by Rumelhart, Hinton and Williams (1986), who called it "the generalized delta rule." Their classic paper played a pivotal role in the revival of ANNs, and in building new bridges between the various disciplines trying to understand the general foundations of learning. However, it also resulted in a false perception of what backpropagation actually is, in many communities. By describing how backpropagation can be applied to a specific, concrete form of ANN, Rumelhart et al communicated the basic idea very effectively to a large audience. On the other hand, many readers drew the false conclusion that backpropagation can only be applied to that particular neural network model, the fully connected feedforward Multi-Layer Perceptron (MLP).

From an engineering viewpoint, backpropagation is a general-purpose algorithm for calculating certain types of derivatives, originally developed in 1974 (Werbos 1994). In the analysis or adaptation of complex nonlinear systems, we often need to calculate the derivatives of a single, crucial target variable (such as "error" or "reward" or "cost" or "profit") with respect to all of the inputs and parameters of that system. Backpropagation is an efficient, local algorithm for computing all of these derivatives, in a single sweep backwards through that system. It can be applied to any sparse or distributed differentiable system, not just an ANN. These derivatives may then be used to guide the adaptation or adjustment of system parameters. For example, they may be used to adapt the parameters which represent the strength of a synapse between neurons; however, this is only one example of a possible system parameter. Another possible example of a tunable parameter might be the strength of connection between a dendritic branch and the main dendritic tree, as in the work of Stuart et al (1997). Whenever we need these kinds of derivatives, we need some form of backpropagation in order to compute them efficiently.

For certain simple cases of ANN (as in vanilla backprop), the backpropagation algorithm reduces to a simple calculation, which can be derived by an application of the classic chain rule for partial derivatives. LeCun (1985) showed that it could also be derived, in these cases, from an application of duality theory from control theory (Bryson and Ho, 1969). However, these derivations do not cover the general case, which I derived more directly from fundamental principles in 1974 (Werbos, 1994). (A variety of authors, such as Widrow, Amari and myself, discussed the possibility of adapting ANNs based on the general idea of error minimization, back in the 1960s; however, they did not provide an algorithm at that time for actually implementing this idea for multilayer ANNs, or for calculating the required derivatives.) See Anderson and Rosenfeld (1998) and Werbos (1994) for some further discussion of this history.

In summary, backpropagation as used in engineering is a fundamental, mathematical design concept similar to the concept of derivative or the concept of feedback. These concepts are not sufficient by themselves to tell us how to design complex, brain-like learning systems; however, it is difficult to imagine any truly complex, general-purpose functional learning system which does not make use of all three concepts—feedback, derivatives and backpropagation—at some level.

This article will provide a condensed review of these points, ranging from the engineering through to the possible implications for biology. It will not provide a detailed tutorial on how to implement or use basic backpropagation, because the previous edition of this Handbook already contains that information. (See also chapter 8 of Werbos (1994).)

Backpropagation in Technology: An Overview

Derivatives play a crucial role in many general-purpose designs in engineering and computer science. Likewise, backpropagation plays a crucial role in many general-purpose learning designs for ANNs. The bulk of these designs fall into one of three categories, depending on what kind of task the design is asked to perform: (1) supervised learning; (2) neuro-identification; (3) neurocontrol.

The bulk of the academic papers and popular literature on ANNs stress the supervised learning applications. However, more than half (perhaps even 90 percent) of the net economic value-added from ANNs and from backpropagation probably results from their use in neuroidentification and neurocontrol. Supervised learning is an easy starting place for building an ANN software system, and it provides an excellent testbed for many concepts in learning theory; however, the mammalian brain—as a whole system—is a neurocontroller, not a supervised learning system (Pribram 1996). In engineering, as in biology, decisions or control are the final product of complex information processing systems. Nevertheless, supervised learning systems can be very useful as subsystems of larger systems, and as testbeds for general concepts about learning. They have generated a lot of revenue in areas such as financial risk assessment and Optical Character Recognition (OCR).

Backpropagation in Supervised Learning

Basics

In supervised learning, we are given a set of input variables, X1(t) through Xm(t), and a set of desired output values, Y1*(t) through Yn*(t), at each time t. We can think of these variables as an input vector, X(t), and a desired output vector, Y*(t). We construct an ANN (or some other structure!) which attempts to predict Y*(t) as a function of X(t). We may describe the ANN mathematically as a function f which outputs:

$$Y(t)=f(X(t), W) \quad (1)$$

where W is a set of "weights" or parameters to be adapted.

In basic backpropagation, we adjust each weight $W_{ij}$ according to:

$$W_{ij}(t+1) = W_{ij}(t) - LR * \frac{\partial}{\partial W_{ij}}(Y^* - Y)^2, \quad (2)$$

where the parameter "LR" is called the "learning rate." (Rumelhart et al (1986) also allow for the addition of a "momentum term," but this has not proved to be especially useful.) The derivatives in equation 2 are calculated by use of a new chain rule, the chain rule for ordered derivatives, defined in the previous edition of this Handbook and discussed at length in Werbos (1994). Vanilla backprop is the special case of basic backpropagation, where f represents a fully-connected feedforwards classical MLP. Basic backpropagation also allows for the use of a Generalized MLP, in which there may be direct connections from the input layer to the output layer, and so on.

Basic backpropagation (including vanilla backprop) has mainly been used in two types of real-world application: (1) pattern classification, where X represents the pattern or image to be classified and Y* represents the correct classification; (2) nonlinear function approximation, where Y*=F(X) is an unknown function.

Considerable research has focused on two questions: (1) how can the performance of basic backpropagation be improved?; (2) when does basic backpropagation perform better or worse than other methods, in supervised learning tasks?

Performance Issues

Mainstream research has focused on two dimensions of performance in supervised learning—generalization and learning speed. In traditional applications, the user begins by constructing a database of vectors X(t) and Y*(t) for T patterns (i.e. for t=1 to T). The first part of the database is used as a training set; in other words, equations 1 and 2 are applied to each of the vector pairs, one after the other, from t=1 to t=T1, for some T1<T. This first pass through the training set is called the "first epoch." Then the exact same procedure is applied again, starting out from the weights which emerged after the first epoch. This second pass through the training set is called the "second epoch." The procedure is repeated again and again until the weights seem to converge. When the database is large and the ANN is well-conditioned (e.g., in the AT&T ZIP code digit recognizer), the weights may converge extremely well after only a dozen epochs. But in other cases, it often requires thousands of epochs. To improve learning speed, we try to reduce the number of epochs (or computer time) required for convergence on the training set. Generalization is the ability of the network to correctly predict observations which it has not been trained on. In traditional studies, generalization is measured by the average prediction error over the test set, the patterns (X(t),Y*(t)) for T1<t≦T. A variety of sophisticated methods have been borrowed from statistics in order to fine-tune the choice of training sets, test sets and validation sets used to compare performance across different types of ANN. Various aspects of these issues are discussed at very great length in many books, such as Weigand and Gershenfeld, Roychowdhury et al, Karny et al, and White and Sofge.

Many users—especially beginning users—may encounter extremely slow learning speeds when using backpropagation. This is usually due to some combination of software bugs, plateau effects (i.e., error surfaces which vary extremely slowly as a function of W) and—far more rarely—local minimum problems. These problems may be distinguished from each other by printing out appropriate diagnostic information, such as error derivatives, expected change in total error from epoch to epoch, changes in average gradient direction from epoch to epoch, and learning rates for each group of weights selected by the user. Methods such as the Adaptive Learning Rate algorithm (chapter 3 of White and Sofge and the corresponding US patent) can usually solve plateau problems, for a judicious partitioning of the network weights. Plateau problems can also be reduced by efforts to encode the inputs X and the desired outputs Y* in a natural way, with reasonable scaling of all the variables, such that the relation between X and Y* is easier to learn. True local minimum problems may require the use of step-by-step learning or "shaping," discussed in White and Sofge and in Werbos (1999). Off-the-shelf software can be very useful to the beginner experiencing such problems, but will often lack critical capabilities.

Many researchers have tried to improve upon equation 2. For example, Shanno and Trafalis have made provocative suggestions for future research which could apply advanced concepts from numerical analysis and operations research to the development of fundamentally new algorithms. Past research on those lines has had little impact as yet on practical applications. However, Feldkamp and Marko of Ford Research have reported much better learning speeds, with more advanced forms of backpropagation and large databases, when they replace equation 2 by certain forms of Distributed Extended Kalman Filtering (DEKF) training.

To improve generalization, most researchers reduce the size of the ANN to the smallest size that does not destroy performance on the training set. This sometimes makes training more difficult (e.g. see Pang and Werbos), but generalization or accuracy is usually more important than training times in most applications today. There is an analogy here to statistics, where reducing the number of independent variables in multiple regression increases the accuracy of the weights and avoids certain common pitfalls. Three (complementary) approaches are often used to minimize network size or complexity: (1) pruning out of connections or weights which contribute little; (2) use of penalty terms in the error function, so as to encourage fewer or smaller weights; (3) weight sharing, to be discussed later. For example, instead of minimizing (Y*−Y)2, as in equation 2, we may adapt the weights in proportion to the derivatives of:

$$E^1(t)=(Y^*(t)-Y(t))^2+k\Sigma W_{ij}^2. \qquad (3)$$

I first proposed this in the 1987 Proceedings of the IEEE Systems, Man and Cybernetics conference, as an extension of advanced work in ridge regression published by statisticians ten years earlier.

More recently, Phatak of SUNY Binghamton and Murray of Edinburgh have focused on a third dimension of performance, relevant to the VLSI implementation of ANNs: fault-tolerance. Phatak has developed penalty terms which encourage many smaller weights, rather than fewer weights. They result in networks which are less vulnerable to the loss of a connection or weight, due to a hardware failure. He has shown that one can achieve high levels of fault tolerance and generalization together, in a single network. These types of networks seem much closer to the brain than traditional ANNs, because they use a larger number of smaller connections, in a more distributed and fault-tolerant arrangement. Murray has developed working chips using this kind of approach.

Alternative Designs For Supervised Learning

Basic backpropagation is currently more popular than all other ANN designs combined, in supervised learning applications. There are many other ANN designs available for that task, most of which permit faster learning but less accuracy. Supervised learning is a very general task, which has been studied by many researchers outside of the neural network field. Bezdek has reviewed a wide variety of methods based on fuzzy logic; he often refers to the supervised learning task as "system identification." Supervised learning is closely related to nonlinear regression and Bayesian inference in statistics. The connections to statistical theory are so close that Leon Cooper has often asked whether neural networks (for supervised learning) will someday be viewed as a subset of statistics—or vice-versa.

Traditional textbooks on statistics often state that there is no single best method for tasks like supervised learning. They usually offer dozens of alternative methods, and provide guidelines to the human user who must choose a preferred method and model structure for each possible application, based on his or her prior knowledge about that application. This approach has been translated into Wolpert's "no free lunch" principle for ANNs. In essence, the "no free lunch" idea states that every supervised learning design is the best for some class of problems, but that none is best for all problems.

The key goal of neural network research is to develop truly general-purpose learning systems which, like the brain itself, can work well across "all" realistic learning tasks which they are likely to encounter. From an engineering point of view, the goal is not to eliminate the use of prior information in specific applications. The goal is to develop a learning system so flexible that it could perform well, after training on enough data, in the case where prior information is not supplied. In practical applications, one would then combine this general learning system with use of prior information to help initialize the network.

Philosophers have wondered for centuries how the human mind could achieve such a general-purpose learning ability, despite paradoxes like the "no free lunch" result. Many neural network learning systems can be viewed as mathematical implementations of ideas developed centuries ago by the Reverent Occam and by Emmanual Kant. The details of these ideas are far beyond the scope of this article. (See chapter 10 of White and Sofge.) In essence, they require the use of nonspecific prior information about the learning problems we expect to encounter. For example, we may assume that the function F which we are trying to approximate is more likely to be a smooth function than a discontinuous one, until we have specific evidence to the contrary. We may assume that simpler theories are more likely to be true or robust than are complex theories. Or we may assume that the weights W are generated from some kind of unknown normal distribution; this results in equation 3.

Many engineers seem to believe that basic backpropagation (with penalty terms and pruning) does provide this kind of universal learning capability, for supervised learning problems. They cite work by Cybenko, Hornik, White and others, who prove that simple MLPs can approximate any smooth function F; one can always make the error as small as one would like, simply by adding more neurons. (See Karny et al.) Other researchers have proven the same for other supervised learning systems, ranging from adaptive Taylor series through to adaptive fuzzy logic and lookup tables. But the universal approximation theorems for lookup tables are not very useful in practice, because the number of table entries required grows exponentially with the number of input variables Xi. Andrew Barron of Yale has proved that a similar combinatorial explosion occurs for all supervised learning systems based on "linear basis functions" (e.g., Taylor series, radial basis functions (RBF), the usual forms of fuzzy logic, etc.); however, it does not occur for MLPs. As the number of inputs rises, the MLP does not require such a rapid increase in the number of inputs, so long as F is a smooth function. Fewer neurons implies fewer weights, which implies greater accuracy in estimating these weights from training sets of fixed size, and better generalization.

This has led to a common rule of thumb in ANN engineering. When the number of input variables is relatively small (3 or 4), RBF networks or wavelet networks are preferred, because they can approximate very well, can be analyzed easily, and can learn quickly. With larger numbers of inputs, back backpropagation is preferred, despite the slower learning speeds. When learning speed and accuracy are both required, and there are many inputs (and the inputs are not all concentrated in a small number of clusters), a variety of hybrid designs are used.

Basic backpropagation still falls short of brain-like performance in supervised learning, for three major reasons: (1) many of the functions F which intelligent systems need to learn are not smooth functions; (2) many of these functions are actually functions of networks of input variables rather than vectors X; (3) there are better ways to handle the tradeoff between learning speed and generalization, using memory-based learning approaches. New ANN designs have been developed which address all three of these concerns, using more advanced forms of backpropagation. However, more research is needed in order to understand, upgrade, integrate and apply these designs.

The issue of nonsmooth functions was raised long ago by Marvin Minsky, in his classic book Perceptrons. Minsky discussed a supervised learning problem called the "connectedness" problem which cannot be solved by feedforward networks such as the MLP. More recently, Pang and Werbos showed how a generalized version of the maze navigation problem gives rise to a nonsmooth function which cannot be learned by an MLP, and cannot be learned either by Hebbian learning or by the truncated version of backpropagation used in the "Simple Recurrent Networks" of cognitive science. However, a Simultaneous Recurrent Network (SRN) was sufficient to solve the problem, if more advanced forms of backpropagation are used. Properly trained SRNs can represent something like the universal Turing machine of computer science. (See chapter 13 of White and Sofge, and related discussions by Giles et al.) This structure moves us part of the way towards a true universal supervised learning system. However, the training of SRNs is even more difficult (and far less studied) than the training of MLPs; again, there is a tradeoff between learning speed and generalization ability. Future research could ease these problems. SRNs promise significant performance advantages in areas like image segmentation and strategy formation, where MLPs have not worked as well as hardwired nonlearning systems (such as published versions of Grossberg's Boundary Contour System). Chua of Berkeley and Roska of Budapest have developed impressive neural chips—called cellular neural networks (CNNs)—which demonstrate the superior capabilities of certain special cases of SRN.

The issue of nonvector inputs has only recently begun to attract serious attention. Years ago, certain linguists began to ask: can we design a supervised learning system which inputs a sentence, and then outputs some property of the sentence? Sentences vary in length and in structure; therefore, it is not natural to represent them as fixed-length vectors X. In 1995, Brauer of Munich described a method called "backpropagation through structure" to address this problem; more precisely, his method included a clever way of using the same, familiar chain rule for ordered derivatives, for the case where the input to the ANN is represented as a kind of tree structure.

More recently (in Karny et al), I have developed a technique called "object symmetry," which would allow the input to the ANN to be some kind of relational network.

This technique is essentially just the nonEuclidean generalization of the well-known technique of weight sharing as described in Pang and Werbos. In Pang and Werbos, we defined a larger SRN by combining a large number of "cells" for each pixel in the input image. In that case, each "cell" is forced to be identical to every other cell, except that the inputs are translated across the image (to follow the "location" of the cell). In the object-symmetric case, there is a small number of cell types, corresponding to the types of objects which exist in the input structure; each cell of a given type is forced to be identical to every other cell of that type, except that the inputs are shifted, as one would expect, so that they come from the neighbors of the cell . . . The exploitation of symmetry is absolutely crucial (as Emmanuel Kant observed!) when a neural network tries to survive in a world made up of millions upon millions of variables. The further development of this class of ANN will naturally link up to the literature on "world models" in robotics and AI, to the literature on "binding" and image multiplexing in neuroscience, and to the literature on metaphors and abduction in psychology and philosophy. Note, however, that these kinds of network would operate at a subsymbolic level.

Networks of this type will also be essential to many practical applications. For example, it may be possible to build "value networks" or "pricing networks" or "health monitoring networks" which input structures representing the states of electric power grids or large-scale communication networks. Some of these applications may be formulated, at first, as supervised learning problems; however, they may eventually require the use of object-symmetric networks as subsystems within more complex neurocontrol designs.

The issue of learning speed and memory-based learning has not received as much attention as it deserves in the engineering community. The basic issue is as follows. In equation 2, the adaptation of weights W is based purely on current observations, X(t) and Y*(t), which are then totally forgotten after time t, in true real-time learning. Most neural network learning schemes—including Hebbian learning—have the same problem. But with all forms of weight-based real-time learning from current experience, there is a tradeoff between learning speed and generalization. Theoretically, the ideal unconstrained learning system would simply remember all experience, and train the function approximation nets from observations in memory. More realistically, we may build some kind of hybrid systems, combining a fast-learning associative memory system with a higher-level generalizing network (like an object-symmetric SRN) which is trained in part from memory. In 1977, I proposed an approach to this problem which I called "syncretism," discussed further in chapter 3 of White and Sofge. Atkeson of Georgia Tech has shown how robots exploiting memory-based learning can perform extremely difficult tasks, such as robotic ping-pong at catching paper airplanes. More recently, Jay McClelland has drawn widespread attention to the theory that a similar mechanism may explain the interplay between the hippocampus and the cerebral cortex; in my earlier work, I proposed that these effects occur most often between different types of cells within the cerebral cortex, but the psychological implications of these competing theories are very similar.

Again, considerable new research will be needed in order to pull this all together, and delineate the options for a true real-time universal supervised learning system.

Backpropagation in Neuroidentification

Neuroidentification is defined as the use of learning-based neural networks (artificial or other) to perform the task which engineers call system identification. System identification is the task of developing a model of the plant to be controlled, or of the external environment of an intelligent system. There are two major variations of the system identification task—deterministic and stochastic.

Deterministic neuroidentification is essentially the same as supervised learning, with two new features added to the task: (1) the inputs X(t) and desired outputs Y*(t) are assumed to form a time-series (or a collection of time series); (2) the networks inputs not only X(t), but also some other variables reflecting X($\tau$) and Y*($\tau$) for earlier time $\tau$<t. All of the issues associated with supervised learning carry over to neuroidentification, but additional complications arise.

Virtually all of the practical applications of neuroidentification today are based on deterministic neuroidentification, using backpropagation through time (BTT). Given a fixed training set, BTT allows one to calculate all the derivatives of a target variable with respect to all of the weights and inputs to a network, even if that network contains an internal "memory," for a computational cost comparable to the cost of running the network in the forwards direction from time t=1 to time t=T. See Werbos (1994), chapter 8, for a tutorial on BTT, with pseudocode. BTT yields exact derivatives, based on a straightforward application of the chain rule for ordered derivatives.

The first working application of BTT, in 1974, was to the estimation of a statistical time-series model—a multivariable ARMAX model—used for political forecasting. Application to ANNs was discussed at greater length at the 1981 IFIP Conference (reprinted in Werbos 1994). Principe of Florida has developed new tutorials and downloadable software, using BTT to adapt a variety of network designs, available from www.nd.com. Feldkamp et al of Ford have used BTT—together with complementary tools—to develop a new misfire detection system, scheduled for deployment on all Ford cars in 2001. This system, combined with neurocontrol of air-fuel ratios and idle speed, is the only proven affordable system from a US manufacturer which meets the tough requirements of the new Clean Air Act for all cars sold in about half the US, starting very soon.

See chapter 10 of White and Sofge for a discussion of the complex tradeoffs between different forms of neuroidentification. Some engineers use simple memory-free designs, which allow the direct use of supervised learning, while others use more complex and robust time-series methods which require the use of BTT. Stochastic neuroidentification (chapter 13) simply adds additional complexity.

BTT is not biologically plausible, because it uses calculations backwards through time in a database. BTT is used in real-time engineering applications, where fast chips are available; thus engineers have not had sufficient incentive to explore alternatives. See Pang and Werbos, and chapter 13 of White and Sofge, for the Error Critic design, which in my view is the only plausible, scaleable real-time design that consistently approximates the correct derivatives of a dynamical system, the derivatives that would have been computed by BTT. Prokhorov of Ford has reported good preliminary results,

Backpropagation in Neurocontrol

Neurocontrol is the use of learning-based neural networks to generate control signals u(t) or decisions. Useful neurocontrol designs fall into three main categories—cloning designs, tracking designs and designs for optimization over time.

Word limitations prohibit a thorough explanation of the practical tradeoffs and applications of these methods. See Werbos (1999) for a practical and expository review. See Werbos (1998) for a more complete mathematical treatment, including new stability results and research challenges.

In brief—cloning methods involve the use of neuroidentification methods to learn a model of a human expert or some other existing control design. Thus they require the same choice of backpropagation methods used in other form of neuroidentification.

The most popular tracking methods, pioneered by Narendra and others, involve the use of backpropagation through a model in order to train a controller network. Older direct methods, which involved learning a mapping from spatial to motor coordinates, have proven to be far less powerful. However, recent results suggest that better stability results as well as better performance can be obtained by reformulating tracking problems as optimization problems.

Neurocontrol methods to minimize or maximize a utility function over time have led to many practical applications in the automotive, aerospace and chemical process industries. The most popular designs are again based on BTT. However, there has recently been an explosion of new interest and new designs involving approximate dynamic programming (ADP), which is sometimes called neurodynamic programming, or reinforcement learning, or adaptive critics. ADP designs are the only known family of working neurocontrol designs which can replicate the most obvious, basic capabilities of the mammalian brain in functional general-purpose engineering systems.

ADP designs involve multiple neural networks coupled into an integrated system. They all contain one (or more) Critic network, which acts as a kind of value function. In some designs, the Critic outputs value measures which correspond exactly to the optimal price signals of microeconomic theory. The most popular designs today are simple designs based on lookup tables, which do not require derivatives or backpropagation; however, such designs are not plausible as models of the entire brain, because they do not scale well to truly large problems or problems involving continuous variables. More advanced designs normally use generalized backpropagation in order to calculate the derivatives of the value function with respect to the weights of a controller network. For example, in White and Sofge, David White describes how he used a relatively simple ADP design, with derivative based training of the controller network, to stabilize F-15s hit by unexpected damage, in simulations using McDonnell-Douglas's best model of the F-15; half the time, the ANN could earn to save the craft within two seconds. These successes led to a major multi-million dollar program at NASA Ames, which (in a first generation implementation) has already landed a real MD-11 airplane with all of its hydraulic controls locked up.

Implications for Biology

References

Known publications discussing neural networks include:
P. Werbos, Learning in the brain: an engineering interpretation. In K. Pribram, ed, *Learning as Self-Organization*, Erlbaum, 1996.
P. Werbos, Neurocontrollers, in J. Webster, ed, *Encyclopedia of Electronics and Electrical Engineering*, Wiley.
R. Howard, Dynamic Programming and Markhov Processes, MIT Press, 1960.
D. P. Bertsekas and J. N. Tsitsiklis, *Neurodynamic Programming*, Belmont. Mass: Athena Scientific, 1996.
R. Sutton, TD Models: Modeling the World at a Mixture of Time Scales. CMPSCI Technical Report 95–114. U. Mass. Amherst, December 1995, later published in *Proc. 12th Int. Conf. Machine Learning*, 531–539, Morgan Kaufmann, 1995.
J. Albus, Outline of Intelligence, *IEEE Trans. Systems, Man and Cybernetics*, Vol.21, No.2, 1991.
Vernon Brooks, *The Neural Basis of Motor Control*, Oxford U. Press, 198.
H. Ritter, T. Martinetz, and K. Schulten, *Neural Computation and Self-Organizing Maps*, Addison-Wesley, 1992.
D. S. Levine and S. J. Leven, *Motivation, Emotion, and Goal Direction in Neural Networks*, Erlbaum, 1992.
P. Werbos & X. Z. Pang, Generalized maze navigation: SRN critics solve what feed forward or Hebbian nets cannot. *Proc. Conf. Systems, Man and Cybernetics (SMC)* (Beijing), IEEE, 1996. (An earlier version appeared in WCNN96 Proc., Erlbaum, 1996.)
X. Z. Pang & P. Werbos, Neural network design for J function approximation in dynamic programming, *Math. Modelling and Scientific Computing* (a Principia Scientia journal), special issue on Neural Nets, Winter 1996–1997
P. Werbos, The brain as a neurocontroller: New hypotheses and new experimental possibilities. In K. Pribram, ed., Origins: Brain and Self Organization, Erlbaum, 1994.
P. Werbos, Applications of advances in nonlinear sensitivity analysis, in R. Drenick & F. Kozin (eds), System Modeling and Optimization: Proc. IFIP Conf. (1981), Springer 1982; reprinted in P. Werbos. The Roots of Backpropagation, Wiley 1994.
J. Houk, J. Keifer and A. Barto, Distributed motor commands in the limb premotor network, Trends Neurosci., Vol. 16, P.27–33, 1933.
J. Houk, J. Davis & D. Beiser (eds), Models of Information Processing in the Basal Ganglia, MIT Press, 1995.
P. Werbos, Values, Goals and Utility in an Engineering-Based Theory of Mammalian Intelligence, in Karl H. Pribram, ed., Brain and Values, Erlbaum: Hillsdale, N.J., 1998.
M. I. Jordan and R. A. Jacobs, Modular and hierarchical learning systems, in M. A. Arbib Handbook of Brain Theory and Neural Networks, MIT Press, 1995, p.579–582.
G. Hirzinger et al, in M. van der Meer, R. Schmidt and G. Wolf eds, Statusseminar des BMBF: Kunstliche Intelligenz, Neuroinformatik und Intelligente Systems, Berlin: DLR, 1996.
Anderson, J., and E. Rosenfeld, eds, Talking Nets, MIT Press, 1998
A. Bryson & Y. C. Ho, Applied Optimal Control, Ginn, 1969.
M. Karny, K. Warwick and V. Kurkova, eds, Dealing with Complexity: A Neural Networks Approach. Springer, London, 1998
Y. LeCun, Une procedure d'apprentissage pour reseau a seuil assymetrique, Proc. Cognitiva 85, p.599–604, Paris, 1985.
X. Z. Pang & P. Werbos, Neural network design for J function approximation in dynamic programming, Math. Modelling and Scientific Computing (a Principia Scientia journal), Vol. 5, NO.2/3, 1996.
K. Pribram and J. King, eds., Learning as Self-Organization, Erlbaum 1996.
V. Roychowdhury, K. Siu & A. Orlitsky eds, Theoretical Advances in Neural Computation and Learning, Kluwer, 1994.
D. Rumelhart, G. Hinton and R. Williams, Learning internal representations by error propagation. In D. Rumelhart and J. McClelland, Parallel Distributed Processing. Vol.1, MIT Press, 1986.
T. Smirnova, S. Laroche, M. Errington, A. Hicks, T. Bliss & J. Mallet, Transsynaptic expression of a presynaptic glutamate receptor during hippocampal long-term potentiation, Science, Vol. 262, p.430–436, Oct. 15, 1993.
Stuart, G., Spruston, N., Sakmann, B. and Hausser, M, Action potential initiation and backpropagation in neurons of the mammalian central nervous system. Trends in Neurosciences 20:125–131, 1997.
A. Weigand & N. Gershenfeld, eds, Time Series Prediction, Addison-Wesley, 1994.
P. Werbos, The Roots of Backpropagation: From Ordered Derivatives to Neural Networks and Political Forecasting, Wiley, 1994.
P. Werbos, Stable Adaptive Control Using New Critic Designs. xxx.lanl.gov: adap-org/9810001 (October 1998); See also www.arxiv.org/abs/adap-org/9810001 and U.S. Pat. No. 6,532,454.

Anderson, J., and E. Rosenfeld, eds, Talking Nets, MIT Press, 1998

A. Bryson & Y. C. Ho, Applied Optimal Control, Ginn, 1969.

M. Karny, K. Warwick and V. Kurkova, eds, Dealing with Complexity:A Neural Networks Approach. Springer, London, 1998

Y. LeCun, Une procedure d'apprentissage pour reseau a seuil assymetrique, Proc. Cognitiva 85, p.599–604, Paris, 1985.

K. Pribram. and J. King, eds., Learning as Self-Organization, Erlbaum 1996.

V. Roychowdhury, K. Siu & A. Orlitsky eds, Theoretical Advances in Neural Computation and Learning, Kluwer, 1994

D. Rumelhart, G. Hinton and R. Williams, Learning internal representations by error propagation. In D. Rumelhart and J. McClelland, Parallel Distributed Processing. Vol.1, MIT Press, 1986.

T. Smirnova, S. Laroche, M. Errington, A. Hicks, T. Bliss & J. Mallet, Transsynaptic expression of a presynaptic glutamate receptor during hippocampal long-term potentiation, Science, Vol. 262, p.430–436, Oct. 15, 1993.

Stuart, G., Spruston, N., Sakmann, B. and Hausser, M, Action potential initiation and backpropagation in neurons of the mammalian central nervous system. Trends in Neurosciences 20:125–131, 1997.

A. Weigand & N. Gershenfeld, eds, Time Series Prediction, Addison-Wesley, 1994.

P. Werbos, The Roots of Backpropagation: From Ordered Derivatives to Neural Networks and Political Forecasting, Wiley, 1994.

P. Werbos, Neurocontrollers, in J. Webster, ed, Encyclopedia of Electronics and Electrical Engineering, Wiley, 1999

[Werbos1] P. Werbos, The brain as a neurocontroller: New hypotheses and new experimental possibilities. In K. Pribram, ed., Origins: Brain and Self Organization, Erlbaum, 1994.

[Werbos2] P. Werbos, Applications of advances in nonlinear sensitivity analysis, in R. Drenick & F. Kozin (eds), System Modeling and Optimization: Proc. IFIP Conf. (1981), Springer 1982; reprinted in P. Werbos. The Roots of Backpropagation, Wiley 1994.

[Houk1] J. Houk, J. Keifer and A. Barto, Distributed motor commands in the limb premotor network, Trends Neurosci., Vol. 16, P.27–33, 1933.

[Werbos3] P. Werbos, The cytoskeleton: Why it may be crucial to human learning and to neurocontrol, Nanobiology, Vol. 1, No.1, 1992.

[Houk2] J. Houk, J. Davis & D. Beiser (eds), Models of Information Processing in the Basal Ganglia, MIT Press, 1995.

[Werbos4] Werbos, Learning in the brain: An engineering interpretation. In K. Pribram and J. King, eds., Learning as Self-Organization, Erlbaum 1996.

[Werbos5] P. Werbos, Values, Goals and Utility in an Engineering-Based Theory of Mammalian Intelligence, in Karl H. Pribram, ed., Brain and Values, Erlbaum: Hillsdale, N.J., 1998.

[Jordan] M. I. Jordan and R. A. Jacobs, Modular and hierarchical learning systems, in M. A. Arbib Handbook of Brain Theory and Neural Networks, MIT Press, 1995, p.579–582.

[White] White & D. Sofge, eds, Handbook of Intelligent Control, Van Nostrand, 1992.

[Hirzinger] G. Hirzinger et al, in M. van der Meer, R. Schmidt and G. Wolf eds, Statusseminar des BMBF: Kunstliche Intelligenz, Neuroinformatik und Intelligente Systeme, Berlin: DLR, 1996.

[Brooks] Vernon Brooks, The Neural Basis of Motor Control, Oxford U. Press, 198.

[Werbos6] P. Werbos, A Brain-Like Design To Learn Optimal Decision Strategies in Complex Environments, in M. Karny, K. Warwick and V. Kurkova, eds, Dealing with Complexity: A Neural Networks Approach. Springer, London, 1998. Also in S. Amari and N. Kasabov, Brain-Like Computing and Intelligent Information Systems. Springer, 1998. See also international patent application #WO 97/46929, filed June 1997, published December 11.

[Bertsekas] D. P. Bertsekas and J. N. Tsisiklis, Neuro-Dynamic Programming,. Belmont, Mass.: Athena Scientific, 1996.

R. Sutton, TD Models: Modeling the World at a Mixture of Time Scales. CMPSCI Technical Report 95–114. U. Mass. Amherst, December 1995, later published in Proc. 12th Int. Conf. Machine Learning, 531–539, Morgan Kaufmann, 1995.

The contents of those publications are incorporated herein by reference in their entirety.

Obviously, numerous modifications and variations of the present invention are possible in light of the above teachings without departing from the intended scope of the present invention.

What is claimed is:

1. A computer program product comprising:
a computer storage medium and a computer program code mechanism embedded in the computer storage medium for causing a microprocessor to control the operation of at least one of a learning-based diagnostic system and a control system, the computer program code mechanism comprising:
a first computer code device configured to identify a number, n, of different types of objects to be modeled for a system;
a second computer code device configured to create at least n feed-forward networks, one for each different type of object identified by the first computer code device;
a third computer code device configured to train each of the at least n feed-forward networks; and
a fourth computer code device configured to produce a global prediction for the system using inputs X(t) and the trained at least n feed-forward networks using a Simultaneous Recurrent Network.

2. The computer program product as claimed in claim 1, further comprising:
a fifth computer code device configured to combine the at least n feed-forward networks into a global feed-forward network, FF; and
a sixth computer code device configured to produce an auxiliary vector, y, for the global feed-forward network, FF, according to:

$$y^{[k+1]}=FF(X(t), y^{[k]}, W).$$

3. The computer program product as claimed in claim 1, wherein the fourth computer code device comprises a fifth computer code device configured to train the Simultaneous Recurrent Network.

4. The computer program product as claimed in claim 2, wherein at least one of the at least n feed-forward networks is configured to use non-Euclidean principles of symmetry.

5. The computer program product as claimed in claim 2, wherein the global feed-forward network is configured to use non-Euclidean principles of symmetry.

6. A computer-implemented method, stored on a recordable media, of producing a global prediction for a system having inputs X(t), the method comprising the steps of:

identifying a number, n, of different types of objects to be modeled for a system;

creating at least n feed-forward networks, one for each different type of object identified;

training each of the at least n feed-forward networks; and producing a global prediction for the system using inputs X(t) and the trained at least n feed-forward networks using a Simultaneous Recurrent Network.

7. The computer-implemented method as claimed in claim 6, further comprising:

combining the at least n feed-forward networks into a global feed-forward network, FF; and producing an auxiliary vector, y, for the global feed-forward network, FF, according to:

$$y^{[k+1]} = FF(X(t), y^{[k]}, W).$$

8. The computer-implemented method as claimed in claim 6, wherein the step of producing comprises training the Simultaneous Recurrent Network.

9. The computer-implemented method as claimed in claim 7, wherein at least one of the at least n feed-forward networks is configured to use non-Euclidean principles of symmetry.

10. The computer-implemented method as claimed in claim 7, wherein the global feed-forward network is configured to use non-Euclidean principles of symmetry.

11. An apparatus for producing a global prediction for a system having inputs X(t), comprising:

means for identifying a number, n, of different types of objects to be modeled for a system;

means for creating at least n feed-forward networks, one for each different type of object identified;

means for training each of the at least n feed-forward networks; and means for producing a global prediction for the system using inputs X(t) and the trained at least n feed-forward networks using a Simultaneous Recurrent Network.

12. The apparatus as claimed in claim 11, further comprising:

means for combining the at least n feed-forward networks into a global feed-forward network, FF; and means for producing an auxiliary vector, y, for the global feed-forward network, FF, according to:

$$y^{[k+1]} = FF(X(t), y^{[k]}, W).$$

13. The apparatus as claimed in claim 12, wherein the at least n feed-forward networks is configured to use non-Euclidean principles of symmetry.

14. The apparatus as claimed in claim 12, wherein the global feed-forward networks is configured to use non-Euclidean principles of symmetry.

* * * * *